United States Patent
Morimoto et al.

(10) Patent No.: US 6,526,216 B1
(45) Date of Patent: Feb. 25, 2003

(54) VIDEO PRODUCTION SYSTEM OF PROGRESS TELEVISION MODE AND RECORDING AND REPRODUCING DEVICE THEREFOR

(75) Inventors: Takeshi Morimoto, Osaka (JP); Toru Yamashita, Hirakata (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/194,802
(22) PCT Filed: Apr. 2, 1998
(86) PCT No.: PCT/JP98/01513
§ 371 (c)(1),
(2), (4) Date: Jan. 5, 1999
(87) PCT Pub. No.: WO98/44728
PCT Pub. Date: Oct. 8, 1998

(30) Foreign Application Priority Data

Apr. 3, 1997 (JP) ............................... 9-084982

(51) Int. Cl.[7] ................................................ H04N 5/76
(52) U.S. Cl. ........................ 386/52; 386/64; 386/131
(58) Field of Search ............................. 386/1, 45, 46, 386/125–126, 131, 4, 52–65; 348/446, 448–452, 458–459, 554–558; H04N 5/76, 5/92, 9/79, 5/781, 7/01, 11/20, 11/22, 3/25, 5/46

(56) References Cited

U.S. PATENT DOCUMENTS 5,594,552 A * 1/1997 Fujinami .................. 386/131
5,717,466 A * 2/1998 Pan et al. .................. 348/450

FOREIGN PATENT DOCUMENTS

JP        9-130747        5/1997

OTHER PUBLICATIONS

Search report corresponding to application No. PCT/JP98/01513.
Copy/Form PCT/ISA/210.

* cited by examiner

Primary Examiner—Thai Tran
(74) Attorney, Agent, or Firm—RatnerPrestia

(57) ABSTRACT

A video production system, which has realized an effective utilization of many existing broadcasting equipments (a time-code generator, an editing controller, etc.) that require a framing with a frequency of 30 Hz and also equipments that function according to a standard of the present time-code defined by a unit of 30 Hz, for a progressive scanning TV format which does not accept a framing by frequency of 30 Hz. An interlaced scanning TV synchronizing signal, which is synchronized of field with a progressive scanning TV signal, is coupled with various kinds of broadcasting equipments (VTRs 102 and 103, a time-code generator 4 and an editing controller 5) from a progressive scanning TV synchronizing signal source 30. In this way, an entire video production system of the progressive scanning TV format is synchronized with the interlaced scanning TV synchronizing signal, and is capable of being synchronized with 30 Hz. Furthermore, by supplying the interlaced scanning TV synchronizing signal to the entire system, the video production system of the progressive scanning TV format is able to use equipments (an editing controller, a time-code signal generator, etc.) of the conventional interlaced scanning TV format.

14 Claims, 15 Drawing Sheets

VIDEO PRODUCTION SYSTEM OF PROGRESS TELEVISION MODE AND RECORDING AND REPRODUCING DEVICE THEREFOR

This Application is a U.S. National Phase Application of PCT International Application PCT/JP98/01513.

FIELD OF THE INVENTION

The present invention relates to a video production system of a progressive scanning television format, and a recording and play-back equipment of the progressive scanning television format used in the same system.

BACKGROUND OF THE INVENTION

A video production system employing a current interlaced scanning television (hereinafter referred to as "TV") format is described hereinafter. One example of the video production systems of the interlaced scanning TV format is shown in FIG. 11.

The system comprises a camera 301 of the interlaced scanning TV format (hereinafter referred to as "interlaced scan camera"), two VTRs 302 and 303 of the interlaced scanning TV format (hereinafter referred to as "interlaced scan VTR" or simply "VTR"), a time-code generator 4, an editing controller 5 and an interlaced scanning TV synchronizing signal source 6 (hereinafter referred to as "interlaced scan synchronizing signal source").

Each item of equipment in this system, except for the interlaced scan synchronizing signal source 6, are provided with interlaced scan synchronizing signal input terminals (I_REF input) 301a, 302a, 303a, 4a and 5a. The interlaced scan synchronizing signal source 6 outputs to these terminals an interlaced scan synchronizing signal that serves as a base of the system.

Timing of each of the items of equipment is controlled on the basis of this interlaced scan synchronizing signal, and the entire system is synchronized.

Also, the time-code generator 4 supplies a time-code signal from an output terminal (TC output) 4d to a time-code input terminal (EXT_TC input) 302c of the VTR 302. This time-code signal represents a signal recorded in a recording tape as a time code at the same time when a video signal is recorded.

The time-code is used later for a positional alignment of material location when executing an editing or a play back of a recorded image material.

When editing the recorded image material, the VTR 302 functions as a play back VTR, and the VTR 303 functions as a recording VTR. A part of the image material recorded on a tape in the VTR 302 is recorded again on a part of a tape in the VTR 303. In this case, the VTR 302 forwards a time-code signal from a time-code output terminal 302d (TC output) of the VTR 302 to a time-code input terminal (EXT_TC input) 303c of the VTR 303.

The editing controller 5, which is connected with the VTRs 302 and 303 by control command bus bars 7 and 8, plays back the VTR 302, records the image material in the VTR 303, and gives commands of a traveling speed of the tape and an operation of recording and play back while searching for a location according to the time-code signal recorded in the tape.

FIG. 13 shows an example of recording track pattern on a tape 412 for use with the VTRs.

There exists a helical track 440, a control track 441 and a time-code track 443 on the tape 412.

Image information is recorded on the helical track 440 aslant with the tape, and each helical track is recorded with an image equivalent to one field (for $\frac{1}{60}$ of a second in case of the NTSC) of interlaced TV signal. Therefore, an image equivalent for one frame (for $\frac{1}{30}$ of a second in case of the NTSC) of the interlaced scanning TV signal is recorded on two tracks.

The control track 441 is recorded with a marking signal 442 which indicates a location (i.e., indicating an end of a second field and a beginning of a first field) of a frame signal (to be described later).

The image signal recorded on the tape 412 is assigned with an address, or a time-code for each frame (a time-code address equals to a frame number if an input signal is the interlaced scanning TV signal). In other words, the time-code track 443 is recorded with a time-code signal. The time-code signal is a signal, which is standardized according to SMPTE12M.

FIG. 12 is a drawing depicting a flow of operation in a VTR of the prior art that records and plays back an interlaced scanning TV signal. FIG. 12 is described hereinafter by referring to FIG. 11 and FIG. 13.

During recording, a video signal is fed in at an input terminal 309, and recorded on the tape 412 after passing through a recording amplifier 310 and rotary heads 311f and 311g. One field of the video signal (every $\frac{1}{60}$ of a second of the video signal in case of the NTSC) is recorded on one helical track.

During play back, the video signal is picked up from the tape 412 by the rotary heads 311f and 311g, and output from an output terminal 318 after passing through a play back amplifier 317.

Numerals 313, 314, 315 and 316 represent switches for turning on a "REC" side during the recording and a "PB" side during the play back.

In the interlaced scanning TV signal, vertical synchronization signals for the first and second fields are positioned at locations, each of which lags a different number of lines from a line where an image display of the preceding field ends. By detecting the above difference, a recorded frame detector 319 detects a location of the first field from the interlaced scanning TV signal of the input terminal 309, and generates a signal to represent the location of the first field. This signal is referred to as a frame signal hereinafter. The frame signal represents the location of the first field, and it also corresponds to two fields of the interlaced scanning TV signal at the same time.

A servo circuit 320 controls a motor 321 according to the frame signal in order to advance the tape 412 at a constant speed during recording. Simultaneously, the servo circuit 320 also sends a control signal (CTL signal) which is phase-synchronized with the frame signal, to record it as a marking signal 442 on the control track 441 by a control head 324.

The control signal defined as the marking signal 442 indicates a punctuation of a frame (i.e., a position at an end of a second field and a start of a first field).

A play back frame detector 323 detects the frame signal out of the interlaced synchronization signal fed in through an interlaced synchronization signal input terminal 322 during the play back.

The servo circuit 320 controls the motor 321 to advance the tape in a manner to maintain the frame signal detected by the play back frame detector 323 to be at a fixed phase with the control signal reproduced by the control head 324.

Frame synchronization between the video signal output from an output terminal 318 and the interlaced synchronization signal from the input terminal 322 is executed in this manner, so as to achieve the frame synchronization without confusing the first field with the second field.

The time-code signal is a time-code value assigned to each of the frames of the video signal recorded on the helical track 440.

The time-code values are, for instance, a series of numbers that increase in successive order (1, 2, 3, 4, 5, . . . , etc.), and each frame of the video signal is assigned with numerals that increase successively. In case of the interlaced scanning TV signal, the time-code values are frame numbers.

During the play back, the time-code is reproduced by the time-code reader 327, and it is output from a time-code output terminal (TC output) 328 via a time-code head 326 and the switch 315.

Simultaneously, the reproduced time-code is forwarded to an external editing controller 5 through a CPU 329 and the control command bus bar 7.

The editing controller 5 ascertains that a desired location on the tape material is correctly played back by monitoring the time-code signal. The editing controller 5 outputs a command to the CPU 329 via the control command bus bar 7 for changing a tape travelling speed if there is a shift. Also, the CPU 329 outputs a phase shifting command to the servo circuit 320, and the servo circuit 320 outputs a motor control modification command to the motor 321, so as to control the play back of the desired location on the tape material.

In supplementing the description, the recorded location is controlled at $1/30$ of a second interval in the VTR using the time-code, which is added at every $1/30$ of a second, and a positional control for the two helical tracks 440 (the first field and the second field of the video signal) within the $1/30$ second interval is carried out by the control signal (this control mechanism is hereinafter referred to as "framing servo-mechanism"), so that no confusion in locations between the first field and the second field will take place.

On the other hand, a progressive scanning TV format, i.e. a non-interlaced scanning TV format, is now emerging as a broadcasting format of the next generation from the conventional interlaced scanning TV format.

The progressive scan TV format is briefly described here (broadcasting standards SMPTE296M and SMPTE293M may be referred for the details).

The SMPTE293M (720×483 Active Line at 59.94 Hz Progressive Scan Production Digital Representation) represents a signal configuration which is generally called 525P, and it is a promising format as the progressive scan TV format having 525 lines. The 525P contains 525 lines (483 effective lines among them) within $1/60$ of a second, and one vertical period ($1/60$ second) constitutes one frame. While a frame period of NTSC is $1/30$ of a second, the 525P does not contain information to represent a $1/30$ second punctuation.

Also, the SMPTE296M (1280×720 Scanning, Analog and Digital Representation and Analog Interface) represents a signal configuration which is generally called 720P, and it is a promising format as the progressive scan TV format for HDTV (high definition television). The 720P contains 750 lines (720 effective lines among them) within $1/60$ of a second, and one second) constitutes one frame. The 720P does not contain information to represent a $1/30$ second punctuation.

Since both formats of the 525P and the 720P have a common problem, a priority is laid on the 720P for the following description.

FIG. 9 and FIG. 10 are excerpted from the SMPTE296M. Those signals are analog signals of the 720P format and a digital signal configuration of the 720P format, and both of them are the progressive scan TV signals.

In a format of the interlaced scan TV signal, one frame of $1/30$ of a second is composed of a first field and a second field of $1/60$ second period, with different configurations of synchronization signal between the first field and the second field, and there is an information for distinguishing the first field and the second field.

However, formats of the progressive scan TV signals in FIG. 9 and FIG. 10 do not compose a field. There is no information corresponding to a $1/30$ second period.

In other words, the progressive scan TV signals do not carry any information corresponding to a $1/30$ second period.

The progressive scan TV signal shown in FIG. 10, or the digital signal of the 720P is marked with SAV and EAV. The SAV and the EAV are abbreviations of "start of Active Video" and "End of Active Video", to denote a start and an end of an effective picture element in each line. Also, the SAV and the EAV include identification bits of F, V and H (shown in FIG. 10). The F bit is for distinguishing between a first field and a second field, the V bit is for indicating a vertical blanking period, and the H bit is for distinguishing between the SAV and the EAV.

Although the interlaced scan TV signal for NTSC, etc. includes the F bit, which is "0" for the first field and "1" for the second field, it is always "0" for the progressive scan TV signal (FIG. 10). That means the progressive scan TV signal does not include any information to detect $1/30$ of a second.

For the above reason, a video production system of the progressive scan TV format can not be controlled at $1/30$ second interval, but it must be controlled at $1/60$ second interval.

A newly developed type of equipment capable of controlling with the progressive scan TV synchronization signal (hereinafter referred to as "progressing synchronization signal") is, therefore, necessary instead of the equipment for the interlaced scan TV format, in order to constitute a video production system of the progressive scan TV format. At least a camera, a VTR, a time-code generator, an editing controller and a synchronization signal source are desired which are capable of controlling with the progressing synchronization signal.

FIG. 14 is a structural drawing of a video production system of the progressive scan TV signal format composed of the newly developed type of equipment.

Referring to FIG. 14, a progressing synchronization signal source 406 generates a progressing synchronization signal for use as a basis of controlling the equipment composing the video production system. A camera 401 of the progressive scan TV format, VTRs 402 and 403 of the progressive scan TV format, a time-code generator 404 and an editing controller 405 are individually equipped with one of input terminals 401b, 402b, 403b, 404b and 405b in which the progressing synchronization signal (P_REF) generated by the progressing synchronization signal source 406 is input, so that each equipment and an entire video production system are controlled by the progressing synchronization signal.

The time-code signal generated by the time-code (TC) generator 404 is input to the VTR 402 through a time-code (EXT_TC) input terminal 402c, and the VTR 402 inputs it to the VTR 403 through a time-code input terminal 403c, so as to control locations of recording, play back and editing with the time-code assigned to each frame and each track. The entire system is controlled at 1/60 of a second in this manner.

FIG. 15 shows an example of a tape track pattern that records the progressive scan TV format of the above case. Intervals between the marking signals showing the frame punctuation and the recorded time-codes are narrower.

As a matter of course, a cost for a complete set of this system is expensive.

SUMMARY OF THE INVENTION

A system based on the progressive scan TV signal format carries out synchronization of a prescribed frame with an interlaced synchronization signal at every two frames of the progressive scan TV signal. This is accomplished by connecting the interlaced synchronization signal which is the basis of the system to some or all of these various types of equipment that compose the system.

DESCRIPTION OF THE PREFERRED EMBODIMENTS

First Exemplary Embodiment

Figure 1:
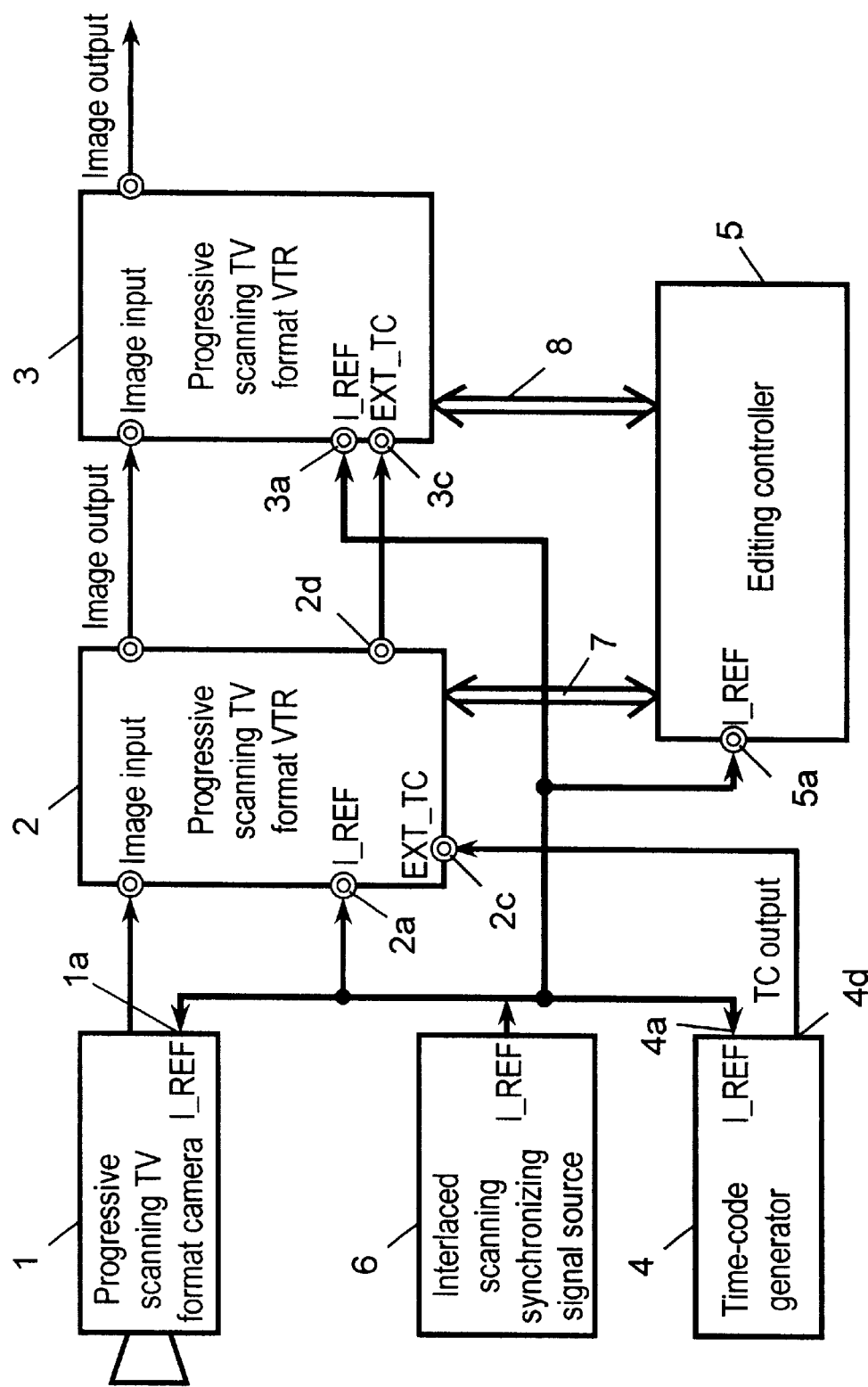
FIG. 1 is a structural diagram of a video production system of the progressive scan TV format of a first exemplary embodiment of the present invention.
Figure 3:
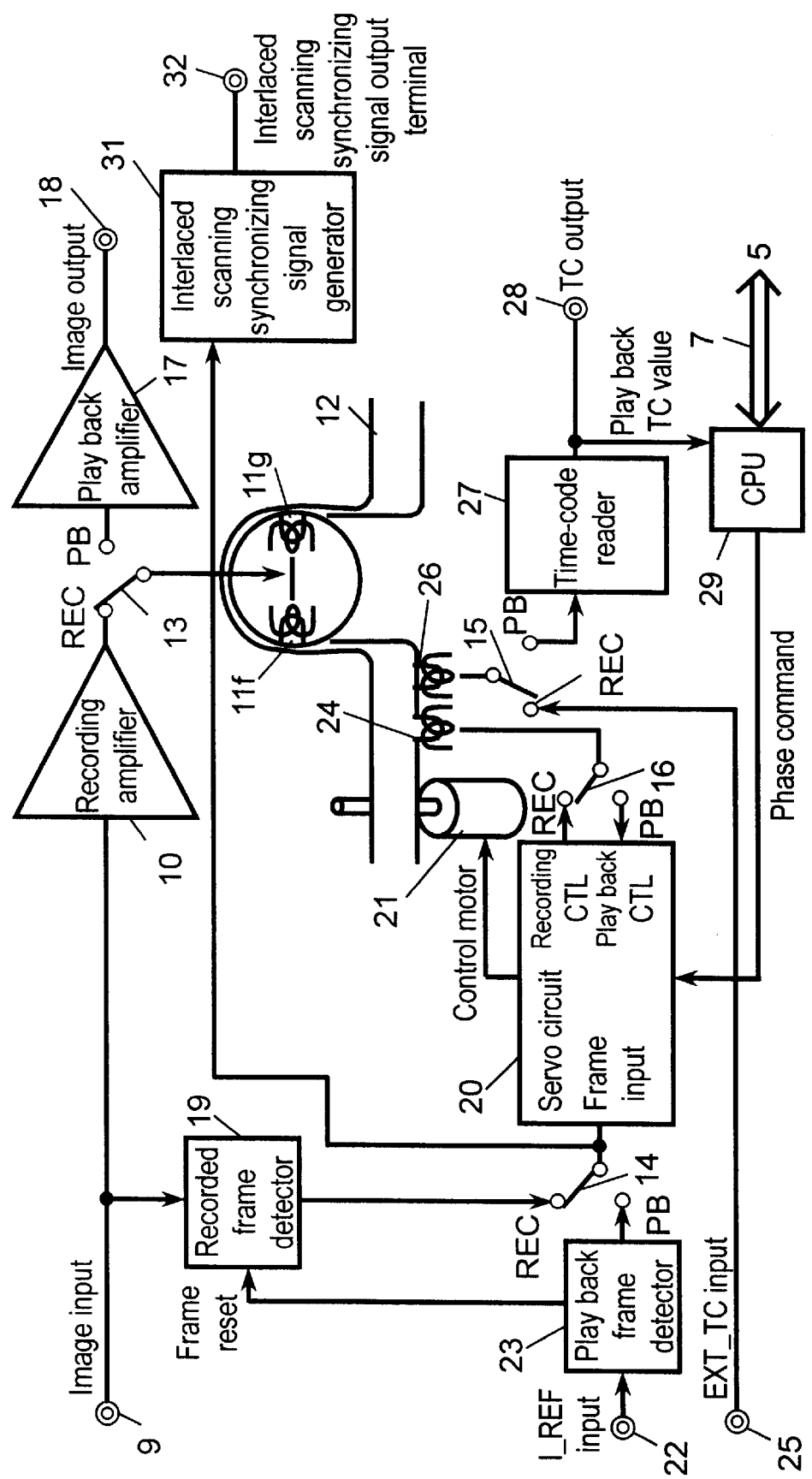
FIG. 3 is a diagram depicting a VTR of the progressive scan TV signal format of a third exemplary embodiment of the present invention.

A first exemplary embodiment of the present invention is described by referring to FIG. 1 and FIG. 3.

FIG. 1 is a structural diagram of a video production system of the progressive scan TV format of the first exemplary embodiment of the present invention.

Among equipment that compose the video production system of the progressive scan TV format of the present invention in FIG. 1, only a progressive scan TV format camera (hereinafter referred to as "progressing camera") 1 and two progressive scan TV format VTRs (hereinafter referred to as "progressing VTR") 2 and 3 are adapted for progressive scan TV. Other equipment (an interlaced synchronizing signal source 6, a time-code generator 4, an editing controller 5, etc.) are the same as those used for a conventional video production system of the interlaced scan TV format. Accordingly, certain descriptions, of which substances are identical to the previous descriptions related to the conventional video production system of the interlaced scan TV format and the VTR used for the same system, will be omitted in describing the present embodiment.

Figure 11:
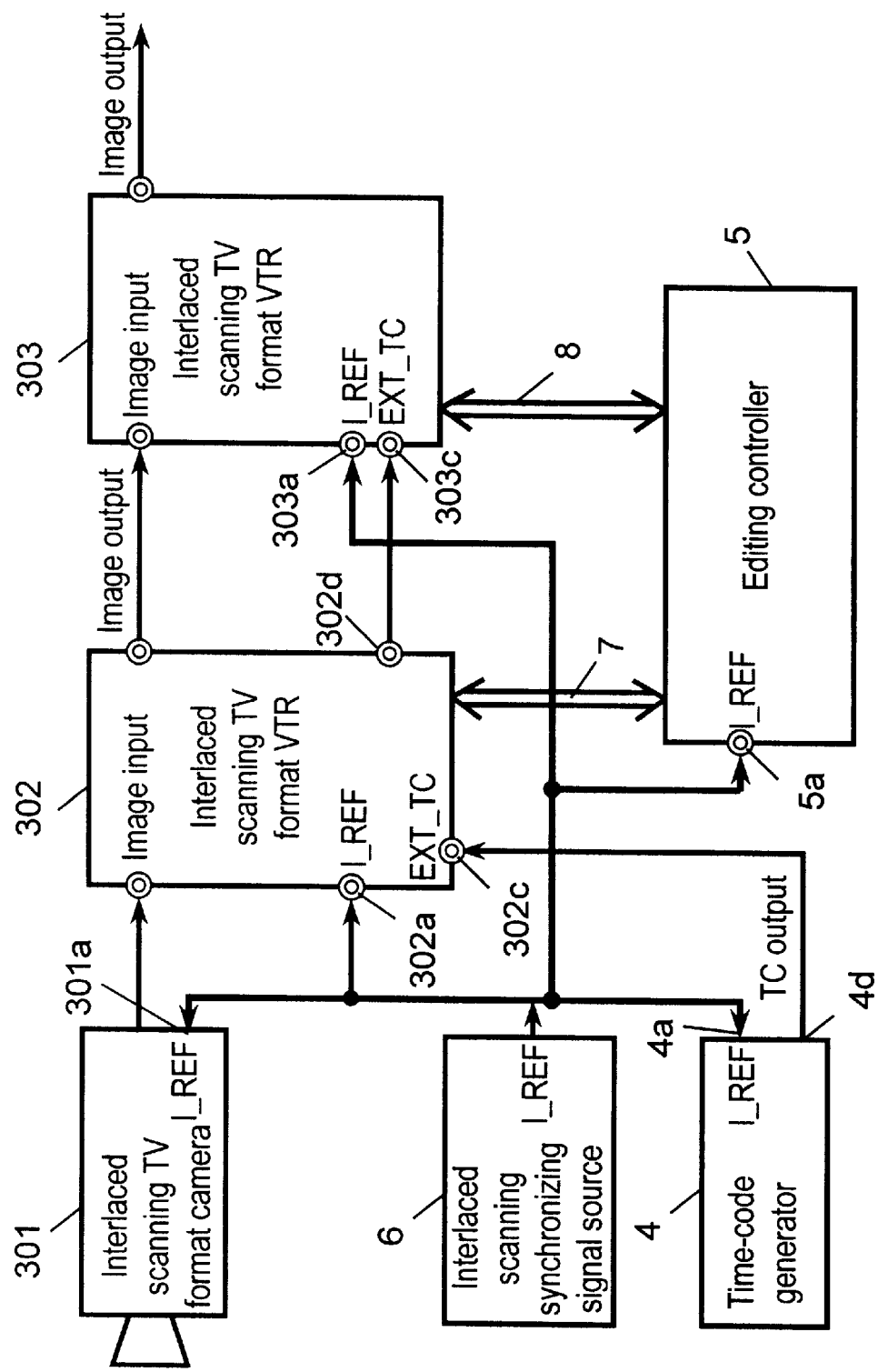
FIG. 11 is an example of a structural diagram of a conventional video production system of the interlaced scan TV format.

The video production system of the progressive scan TV format in FIG. 1 is now compared with the conventional video production system of the interlaced scan TV format in FIG. 11. Although the camera 1 and the two VTRs 2 and 3 are adapted for the progressive scan TV format, as has been described, interconnections among the equipments and an input and output of signals remain unchanged.

Figure 14:
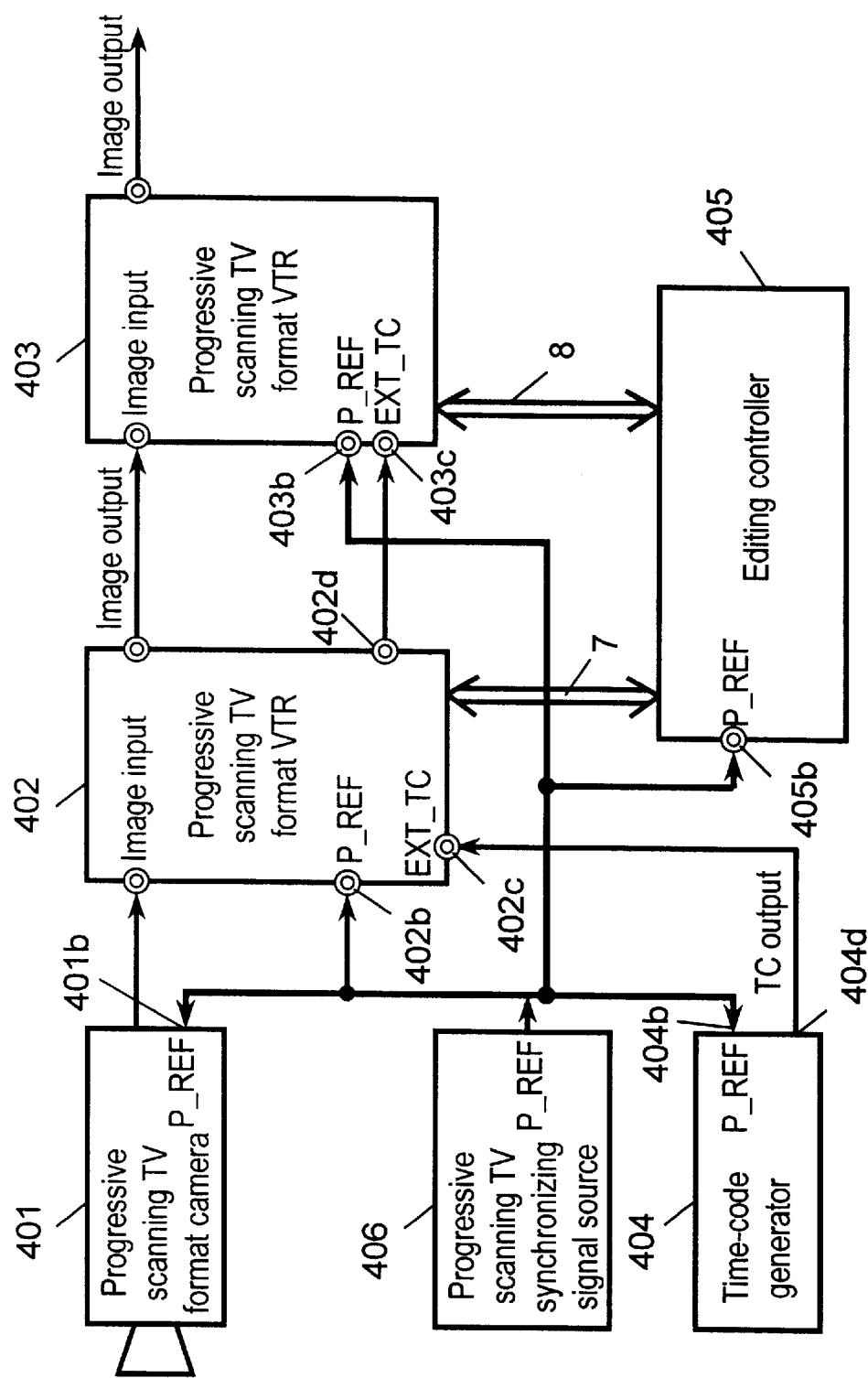
FIG. 14 is a structural diagram of a conventional video production system of the progressive scan TV format.
Figure 15:
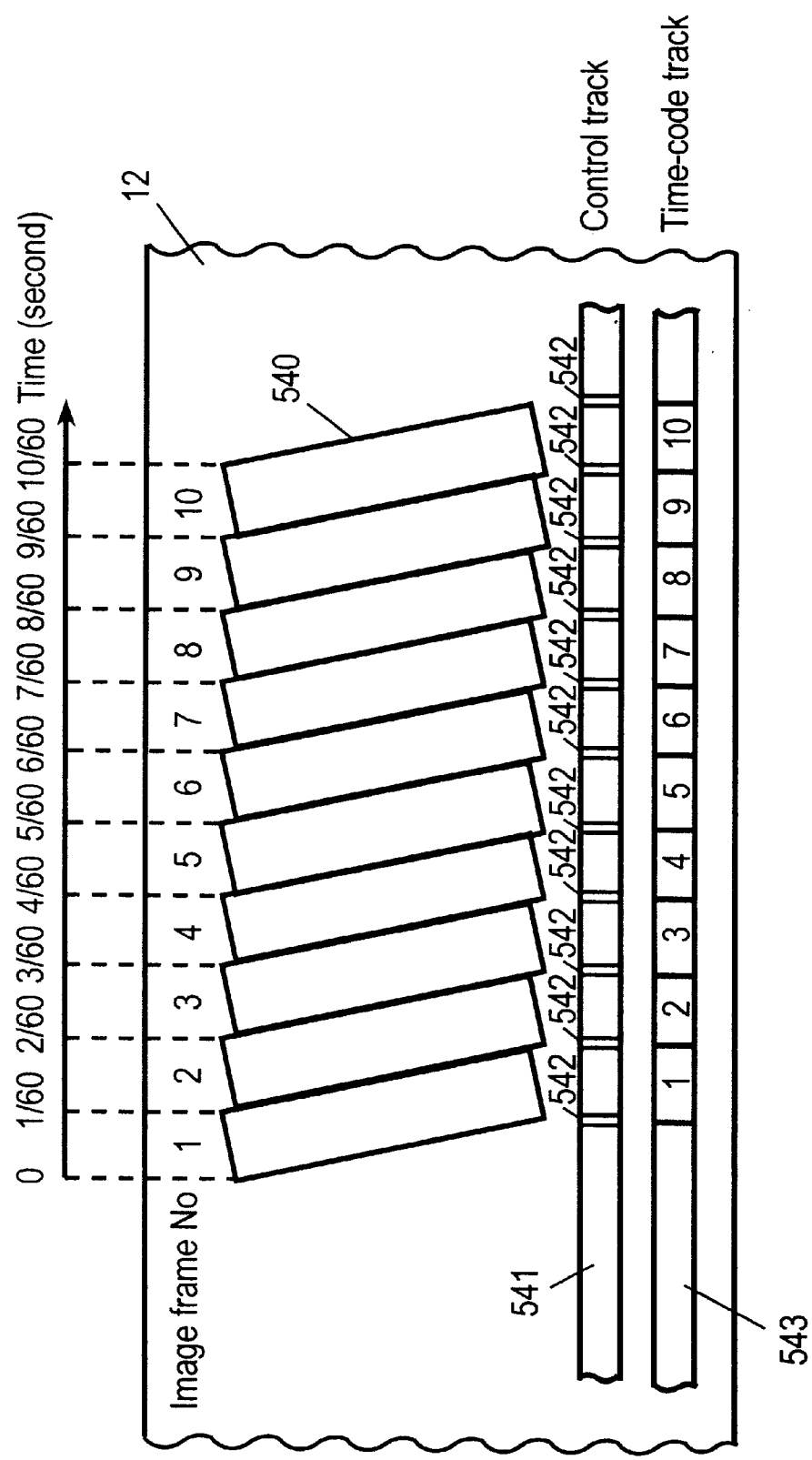
FIG. 15 is a drawing depicting an example of a conventional tape track pattern recorded with a progressive scan TV signal.

However, with respect to a difference of FIG. 1 as compared to a conventional video production system of the progressive scan TV format in FIG. 14, the system of the present invention utilizes a synchronization signal in the interlaced scan TV signal. By contrast, the conventional system carries out synchronization control of the system with a synchronization signal in the progressive scan TV signal.

In other words, in the video production system of the progressive scan TV format of the present embodiment, the interlaced synchronizing signal source 6 generates an interlaced synchronizing signal, which is the basis of the system. This interlaced synchronizing signal is supplied to each piece of equipment in the video production system for carrying out synchronizing control (synchronizing lock).

In case of the progressive scan TV system of 720P or 525P, a frame frequency is 60 Hz. Thus the present invention utilizes a vertical and horizontal synchronizing composite signal of NTSC with or without a color sub-carrier, as the interlaced synchronizing signal.

The progressing camera 1 composing the system has an input terminal (I_REF input) 1a of the interlaced synchronizing signal in order to utilize the interlaced synchronizing signal as a basic synchronizing signal. A progressive scan TV signal output by the progressing camera 1 is controlled for synchronization by the interlaced synchronizing signal.

Detection of a frame, generation of a frame signal and a framing servo mechanism in the progressing VTRs 2 and 3 will be described in a third exemplary embodiment. The synchronizing control of the present invention, however, relates to two successive frame signals generated by the progressive scan TV signal which are regarded as signals of a first field and a second field of the interlaced scan TV signal. Every two frames are controlled with frame signals detected in the interlaced synchronizing signal.

The time-code generator 4 receives the interlaced synchronizing signal output by the interlaced synchronizing signal source 6, detects out of the interlaced synchronizing signal a location of the first field included in the interlaced synchronizing signal, produces a frame signal to indicate a location of the first field based on the information, and then generates a time-code signal according to the frame signal.

The progressing VTR 2 receives the interlaced synchronizing signal through an interlaced synchronizing signal input terminal 2a, and, upon input of the video signal, a servo circuit 20 records a marking signal on a tape while maintaining synchronization of a control signal with two helical tracks of a video signal and also with the time-code signal, as shown in FIG. 3.

The progressing VTRs 2 and 3 produce a frame signal to indicate a location of the first field out of the interlaced synchronizing signal, and operate the framing servo mechanism of 30 Hz by the frame signal. As a consequence, the time-code input signal of 30 Hz for writing the time-code on the tape at every two frames coincides with a punctuation of the frame controlled by the framing servo mechanism for controlling the frame location at 30 Hz.

Hence, the progressed scan TV signal output from the progressing camera 1 and the progressed scan TV signals input to and output from the progressing VTRs 2 and 3 are output with the frame phases being locked by the interlaced scan TV signal.

Description for these phase lock circuits is omitted since they are not peculiar ones, but they can be of an ordinary structure.

In this manner, a position wherein the progressed scan TV signal is recorded is controlled. That is, a positional control for the image material is accurately carried out.

The present invention enables existing equipment for the interlaced scanning TV format to be useful also for the progressed scanning TV format. This is accomplished without requiring a large investment. The invention realizes a system of the progressed scanning TV format that is capable of carrying out positioning control for the image material with the VTRs of existing time-codes.

Second Exemplary Embodiment

Figure 2:
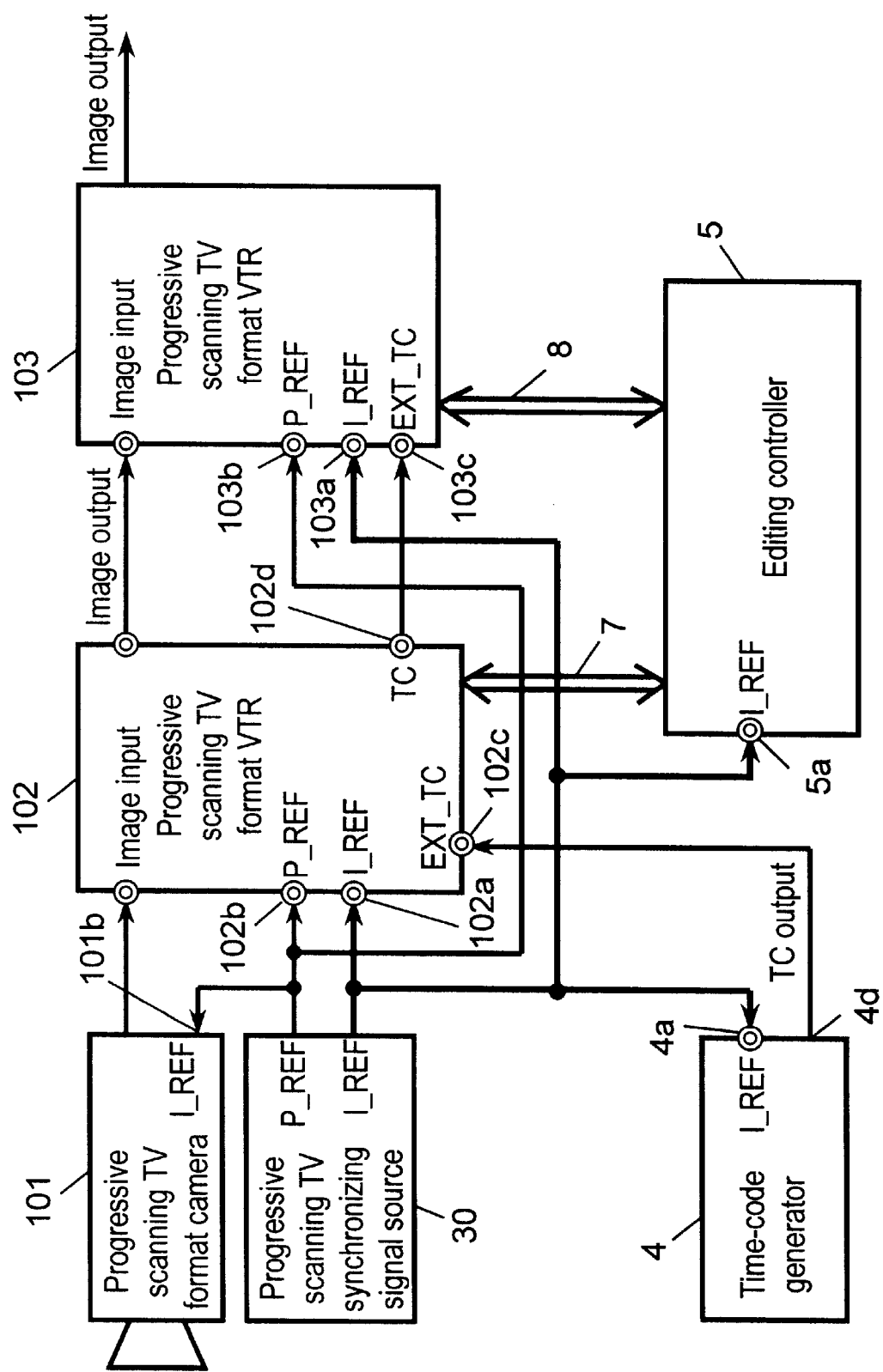
FIG. 2 is a structural diagram of a video production system of the progressive scan TV format of a second exemplary embodiment of the present invention.

A second exemplary embodiment of the present invention is described by referring to FIG. 2.

FIG. 2 is a structural diagram of a video production system of the progressive scan TV format of the second exemplary embodiment of the present invention. Any structural elements, which are same as those described in the first exemplary embodiment as shown in FIG. 1, with the same functions, will be assigned with the same reference codes, and their descriptions will be omitted. Certain descriptions, whose substances are identical to the descriptions related to the conventional video production system of the interlaced scan TV format and the VTR used for the same system, will also be omitted.

A system of the present embodiment has the following differences from the system described in the first exemplary embodiment shown in FIG. 1.

1) A progressing camera 101 is not provided with an interlaced scan TV synchronizing signal input terminal, but is provided with a progressive scan TV synchronizing signal input terminal (P_REF input) 101b.

2) Progressing VTRs 102 and 103 are provided with both of interlaced scan TV synchronizing signal input terminals (I_REF input) 102a and 103a, and progressive scan TV synchronizing signal input terminal (P_REF input) 102b and 103b.

3) A progressing synchronizing signal source 30 is provided in place of the interlaced synchronizing signal source 6 as a synchronizing signal source for outputting a signal for use as a basis of controlling the system. The progressing synchronizing signal source 30 generates at least an interlaced synchronizing signal and a progressing synchronizing signal, synchronizes these signals with each other, and outputs both synchronizing signals.

4) The progressing synchronizing signal output by the progressing synchronizing signal source 30 is supplied to progressive scan TV related equipment, i.e. the progressing camera 101 and the progressing VTRs 102 and 103 in this embodiment, and the progressing synchronizing signal is utilized for producing a clock necessary for processing internal video signal, etc. in them.

The progressing camera 101 is not input with the interlaced scan TV synchronizing signal, as it does not require a 30 Hz information.

The progressing VTRs 102 and 103 require the progressing synchronizing signal and the interlaced synchronizing signal for a framing servo mechanism, which controls a 30 Hz time-code and a position of frame at 30 Hz, in order to control image material.

5) System equipment related to the image material control (a time-code generator 4, an editing controller 5, the progressing VTRs 102 and 103, etc.) are supplied with a common interlaced synchronizing signal, so as to realize accurate image material control on the basis of 30 Hz time-code.

With the structure as described above, a position wherein the progressive scan TV signal is recorded is controlled, so that the positional control can be carried out accurately.

The present invention can realize a system of the progressed scan TV format that is capable of carrying out positional control for the image material with a practical use of the existing equipments for the interlaced scan TV format as well as the VTRs of the existing time-code, without necessitating a large investment.

Third Exemplary Embodiment

Figure 12:
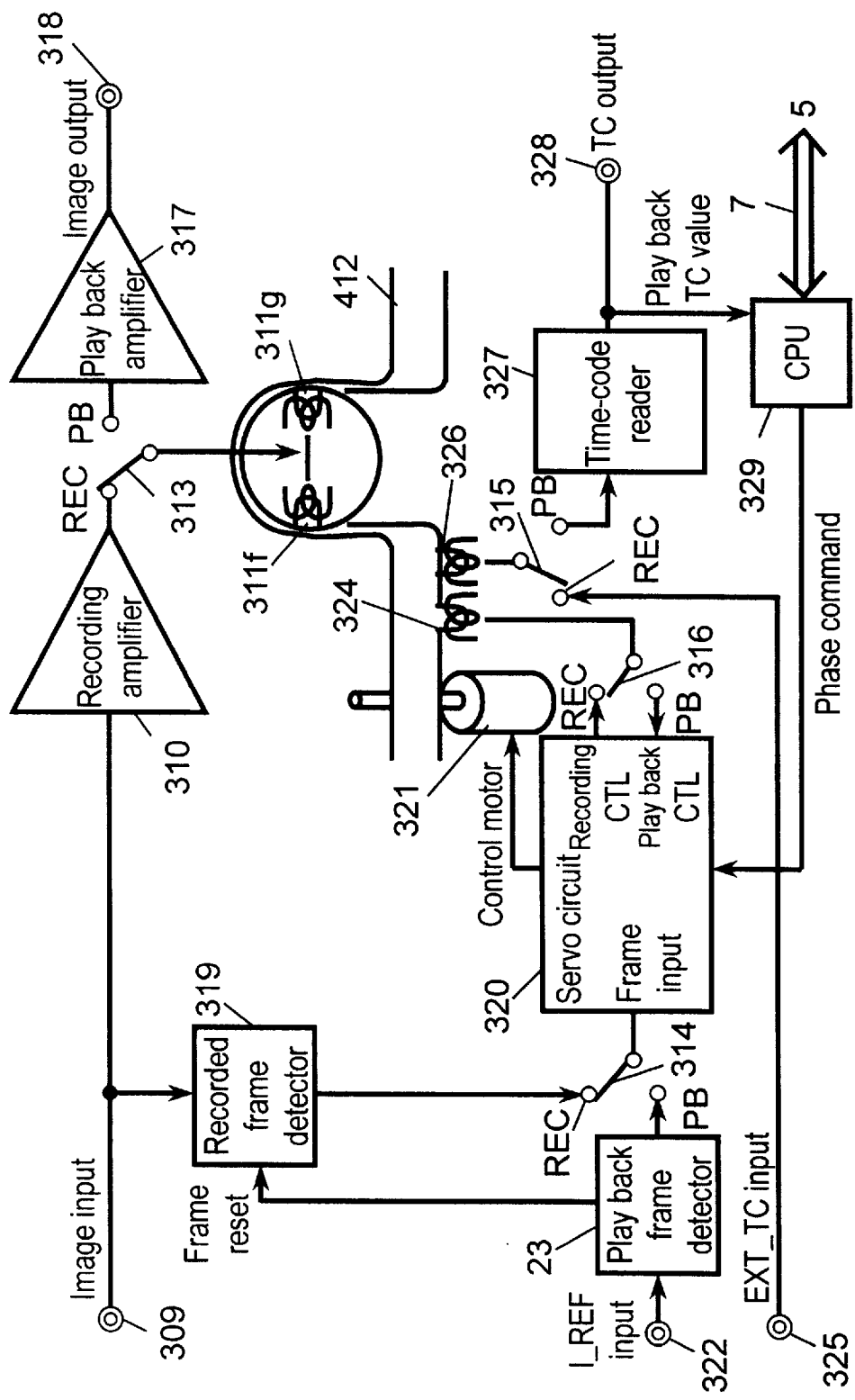
FIG. 12 is a descriptive diagram of a conventional VTR for recording and playing back an interlaced scan TV signal.

FIG. 3 shows a progressing VTR of a third exemplary embodiment of the present invention. It is one embodiment of the progressing VTR utilized in the video production system of the progressive scan TV format shown in FIG. 1, which has been described in the first exemplary embodiment. Differences from the conventional VTR of the interlaced scan TV format shown in FIG. 12 are described hereinafter.

A progressive scan TV signal flows through a video signal input terminal 9, a video signal output terminal 18, a recording amplifier 10, a play back amplifier 17, and rotary heads 11f and 11g.

Although a recorded frame detector 19 is also supplied with the progressive scan TV signal, it can not produce a frame signal (30 Hz) out of the input video signal.

For this reason, the present embodiment detects position of a first field of 30 Hz by a play back frame detector 23 using the interlaced synchronizing signal which is input through the interlaced synchronizing signal input terminal 22. A frame signal is then produced. A phase of the frame signal (30 Hz) output by the recorded frame detector 19 is then fixed by means of resetting the recorded frame detector 19 with the frame signal.

This fixed phase of the frame signal (30 Hz) coincide with phase of a 30 Hz time-code signal which is output from a time-code generator 4 and input through a time-code input terminal (EXT_TC input) 25 (same as 2c in FIG. 1). Therefore, in the same manner as the tape pattern recorded with the interlaced scan TV signal of the prior art shown in FIG. 13, a tape pattern recorded with the progressive scan TV signal of the present invention indicates that all punctuations of two tracks on a helical track 40, a marking signal 42 on the control track 41 and a time-code signal on the time-code track 43 coincide, as shown in FIG. 8.

Figure 8:
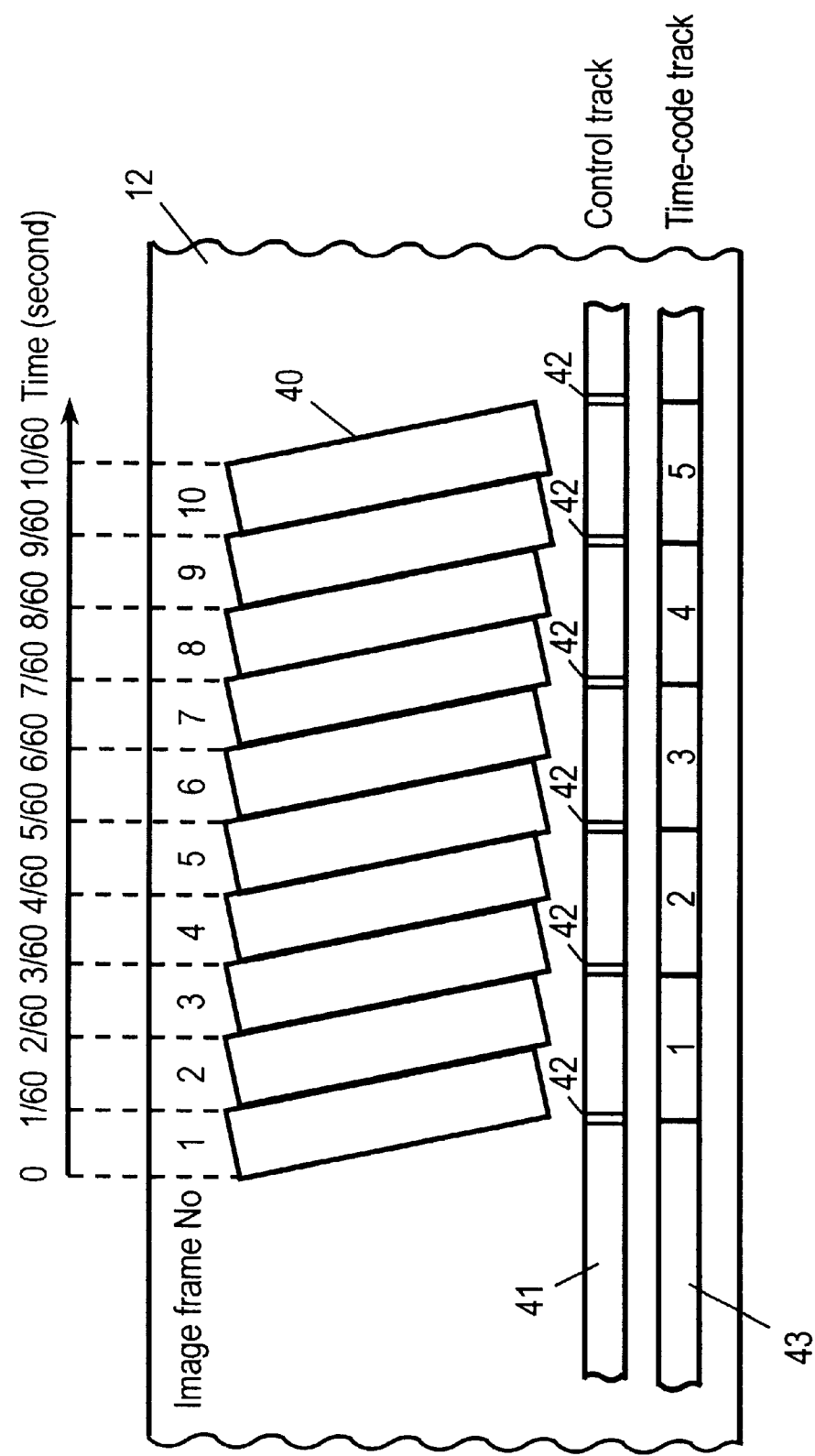
FIG. 8 is a drawing depicting an exemplar of a tape track pattern recorded with a progressive scan TV signal by means of an exemplary embodiment of the present invention.
Figure 9:
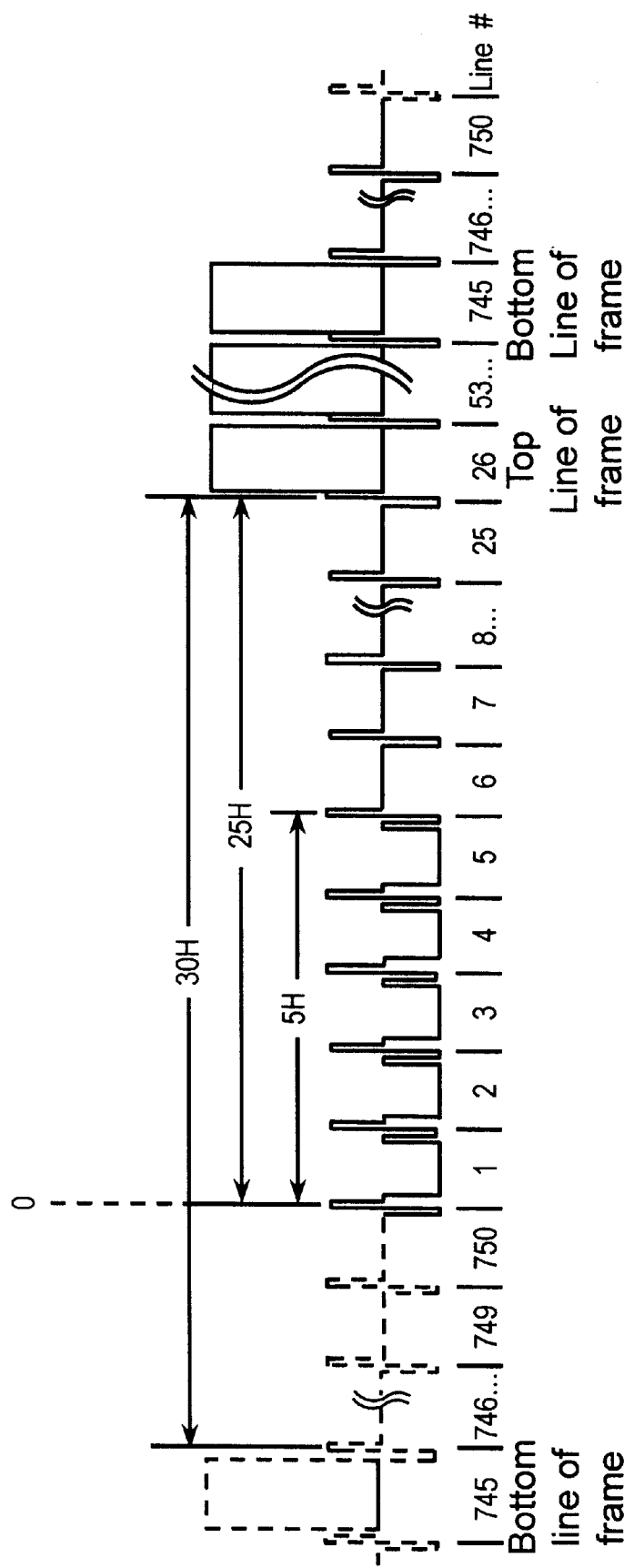
FIG. 9 is a waveform figure in a V blanking period of the 720P analog signal (an excerpt from the SMPTE296M)
Figure 10:
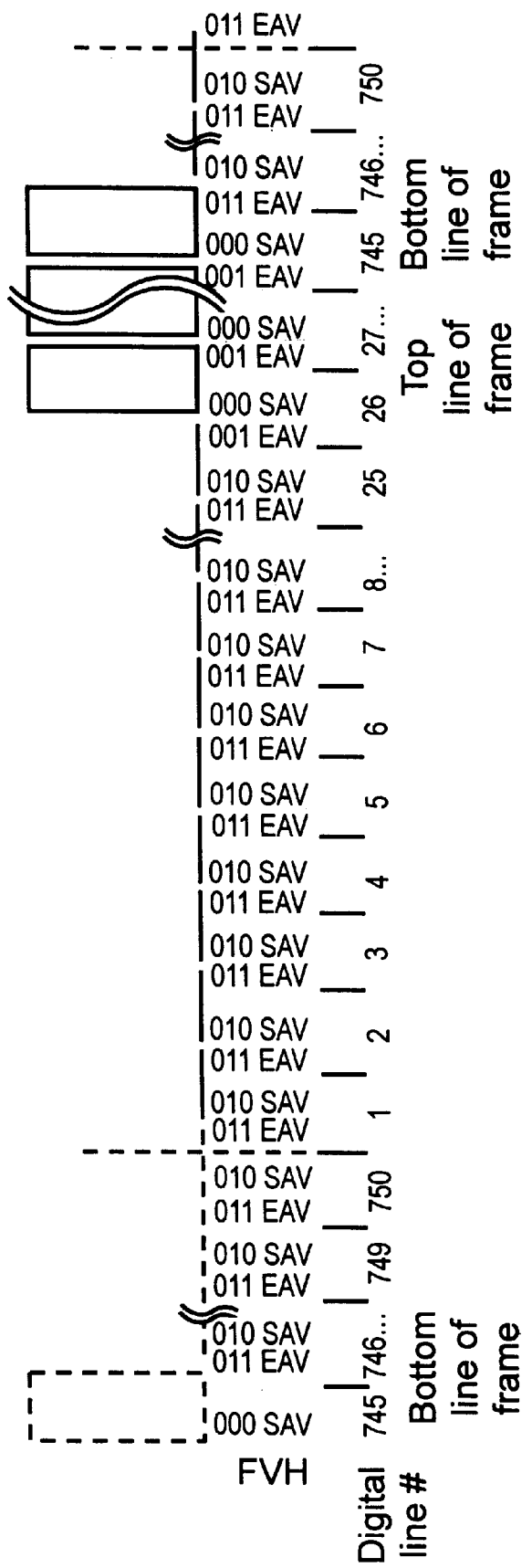
FIG. 10 is a waveform figure in a V blanking period of the 720P digital signal (an excerpt from the SMPTE296M)
Figure 13:
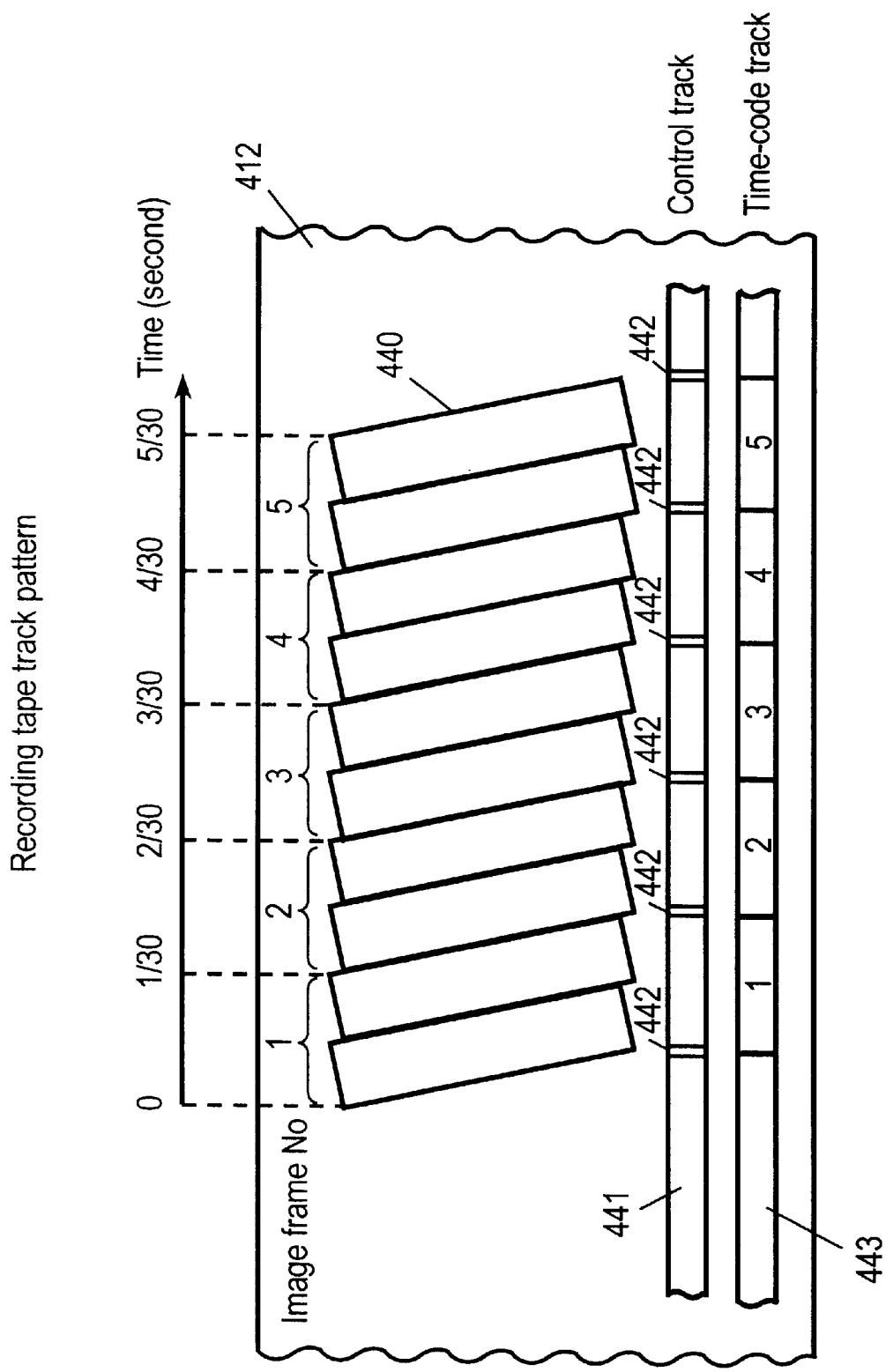
FIG. 13 is a drawing depicting an example of a conventional tape track pattern recorded with an interlaced scan TV signal.

Although the tape pattern recorded with the interlaced scan TV signal of the prior art shown in FIG. 13 is same as the tape pattern recorded with the progressive scan TV signal of the present invention shown in FIG. 8, a time-code address recorded on the time-code track coincides with a frame number in FIG. 13, and a time-code address recorded on the time-code track is recorded every two frames in FIG. 8.

In FIG. 8, a frame position of the progressive scan TV signal is fixed upon recording the video signal.

Also, a servo circuit 20 can fix phase of a play back framing (30 Hz) during play back, since it controls the frame phase with a frame signal obtained from the interlaced synchronizing signal input through an interlaced synchronizing signal input terminal 22.

Accordingly, since it can make a positional relationship between the recording and play back framing (30 Hz) of the servo circuit 20 and the time-code signal of the time-code input terminal identical to what is in the case of the VTR of the interlaced scan TV format (prior art), an accurate control of image material can be realized on the basis of 30 Hz time-code.

Furthermore, an interlaced synchronizing signal generator 31 produces an interlaced synchronizing signal by using the recording and play back frame signal (30 Hz), and outputs the signal from an interlaced synchronizing signal output terminal 32.

The interlaced synchronizing signal generator 31 generates and outputs a same signal as an output of the interlaced synchronizing signal source 6 in FIG. 1.

A progressive scan TV editing system can desirably be assembled with the interlaced synchronizing signal generator 31, two VTRs having the interlaced synchronizing signal output terminal 32 and the editing controller 5, even without the interlaced scan TV signal generating source 6.

Fourth Exemplary Embodiment

Figure 4:
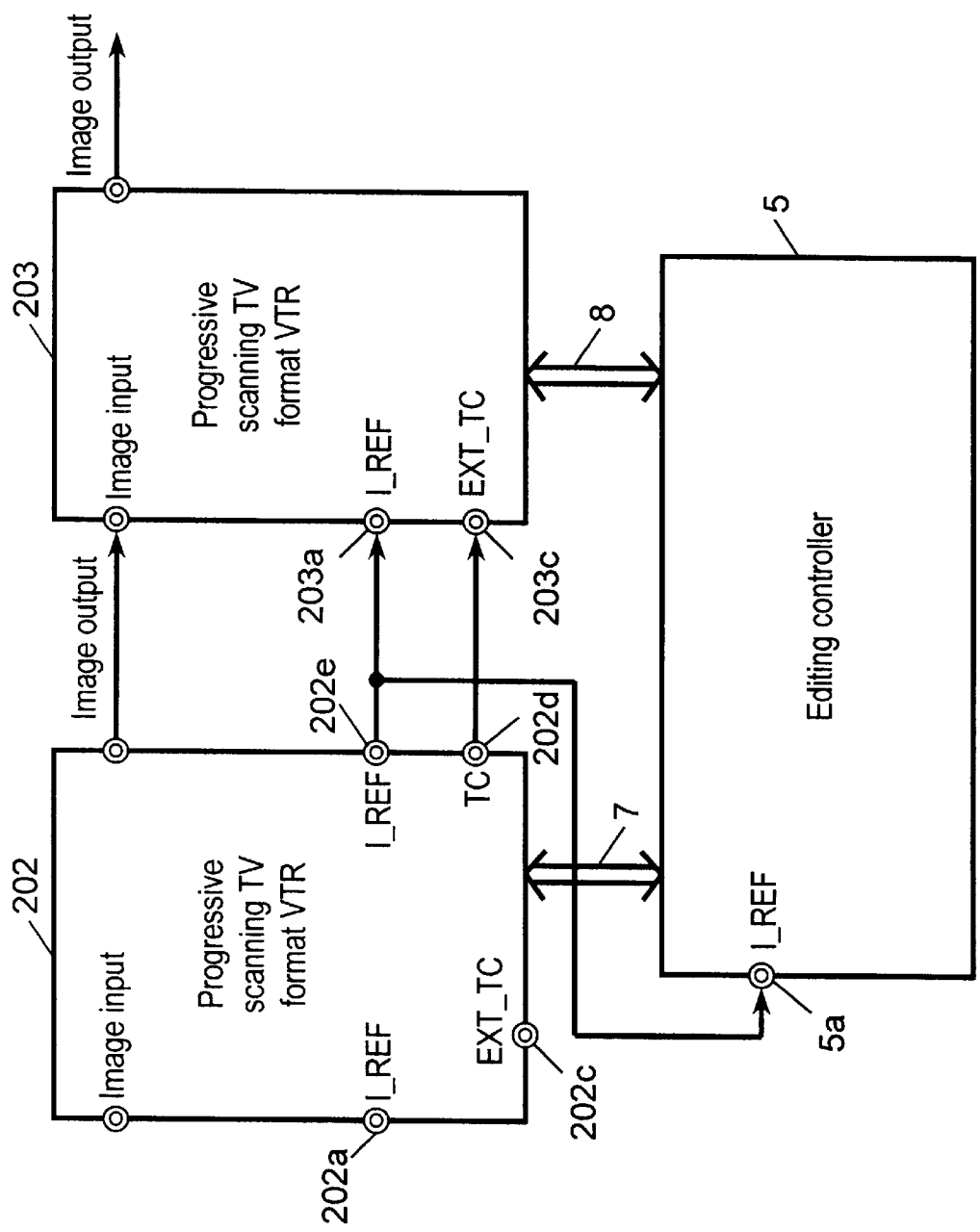
FIG. 4 is a structural diagram of a video production system of the progressive scan TV format of a fourth exemplary embodiment of the present invention.

FIG. 4 depicts a structural diagram of a video production system of the progressive scan TV format of a fourth exemplary embodiment.

A progressing VTR 202 is a play back device and a progressing VTR 203 is a recording device.

An interlaced synchronizing signal output terminal 202e is connected with an interlaced synchronizing signal input terminal 203a of the progressing VTR 203 and an interlaced synchronizing signal input terminal 5a of an editing controller 5. The editing controller 5 and the progressing VTR 203 are synchronized by a play back framing information of the progressing VTR 202. Also, a play back time-code output terminal 202d is connected with a play back time-code input terminal 203c.

In this manner, a 30 Hz time-code used in the progressing VTRs 202 and 203 and the editing controller 5 is synchronized with a 30 Hz framing, so as to be able to realize an accurate control of image material on the basis of the 30 Hz time-code.

Fifth Exemplary Embodiment

Figure 5:
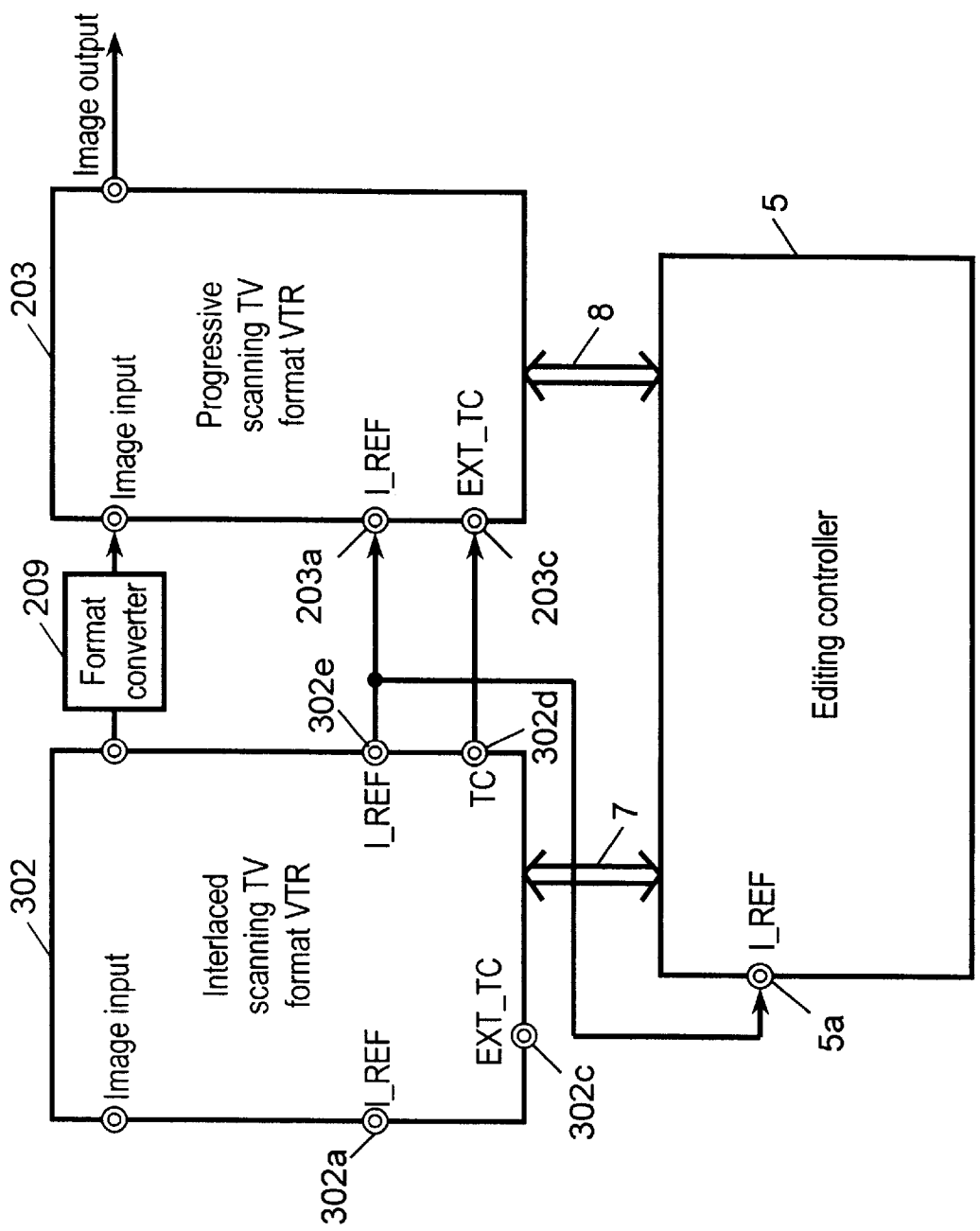
FIG. 5 is a structural diagram of a video production system of the progressive scan TV format of a fifth exemplary embodiment of the present invention.

FIG. 5 depicts a structural diagram of a video production system of the progressive scan TV format of a fifth exemplary embodiment. The present embodiment is an example of the system structure which arises when an equipment of the interlaced scan TV format and an equipment of the progressive scan TV format coexist.

The video production system of FIG. 5 comprises an interlaced VTR 302 as a play back device, a progressing VTR 203 as a recording device, an editing controller 5 and a format converter 209.

The interlaced VTR 302 as a play back device for the interlaced scanning reproduces image material of the interlaced scanning. The reproduced image signal of the interlaced scanning format is input to the format converter 209, and then to the progressing VTR 203 as a recording device after being converted into an image signal of the progressive scanning format.

An interlaced scanning synchronizing signal output terminal 302e of the play back VTR 302 is connected with an interlaced scanning synchronizing signal input terminal 303a of the recording VTR 203 and an interlaced scanning synchronizing signal input terminal 5a of the editing controller 5, so that the editing controller 5 and the recording VTR 303 are synchronized by a play back framing information of the play back VTR 302. Also, a play back time-code output terminal 302d is connected to a time-code input terminal 203c.

The 30 Hz time-code used in the interlaced VTR 302, the progressing VTR 303 and the editing controller 5 are synchronized with a 30 Hz framing, so as to be able to realize an accurate control of image material on the basis of the 30 Hz time-code.

Accordingly, a video production system of the progressive scanning TV format is able to record and edit the interlaced scanning TV signal as the progressive scanning TV signal by converting it to the progressive scanning TV signal.

Sixth Exemplary Embodiment

Figure 6:
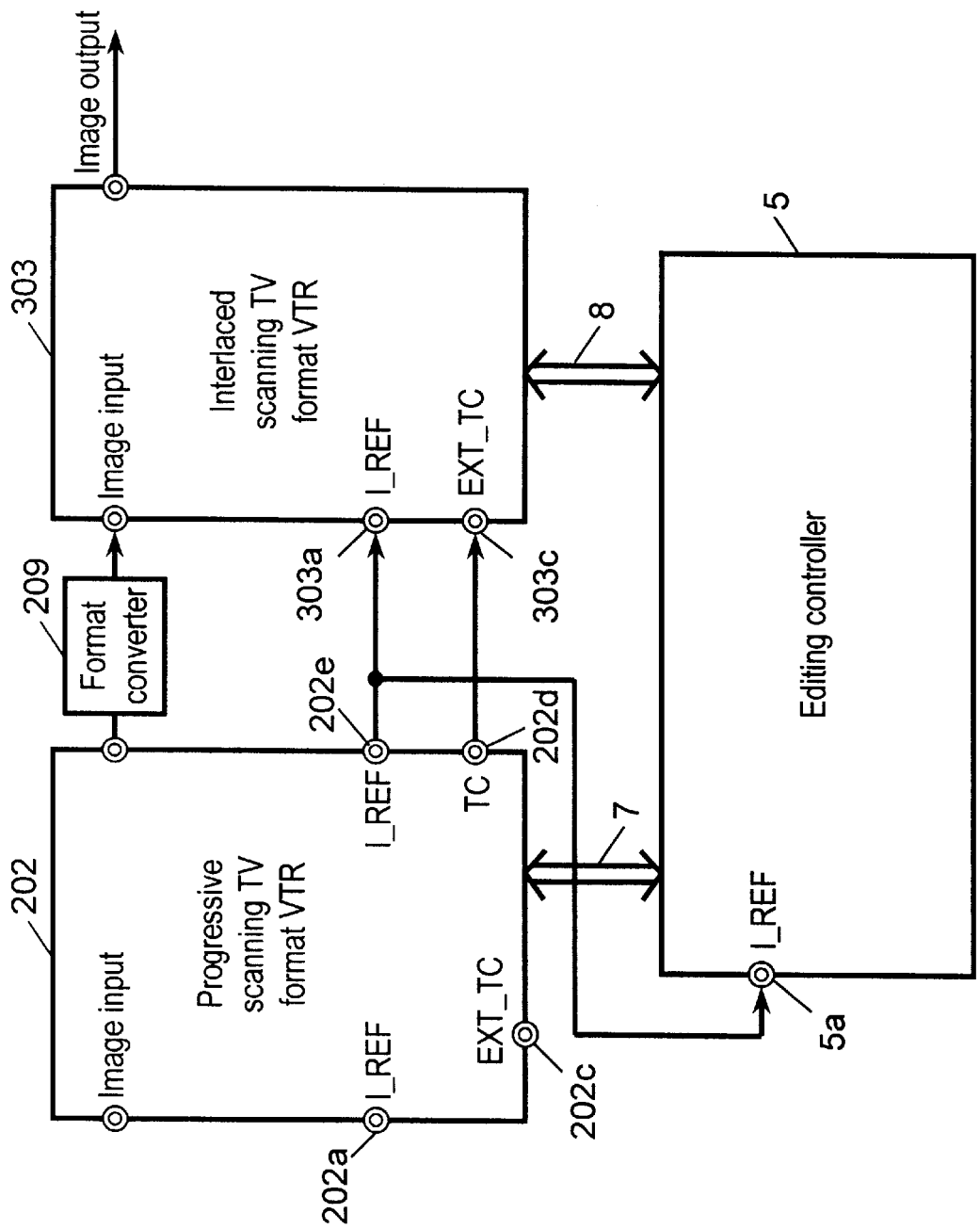
FIG. 6 is a structural diagram of a video production system of the progressive scan TV format of a sixth exemplary embodiment of the present invention.

FIG. 6 depicts a structural diagram of a video production system of the progressive scan TV format of a sixth example embodiment. The present embodiment is also an exemplar of the system structure which arises when an equipment of the interlaced scan TV format and an equipment of the progressive scan TV format coexist.

The video production system of FIG. 6 comprises a progressing VTR 202 as a play back device, an interlaced VTR 303 as a recording device, an editing controller 5 and a format converter 209.

The progressing VTR 202 reproduces image material of the progressive scan TV format. The reproduced image signal of the progressive scan TV format is input to the format converter 209, and it is then input to the interlaced VTR 303 as a recording device after being converted into an image signal of the interlaced scanning TV format.

A terminal 202e for outputting the interlaced scanning synchronizing signal produced by the play back VTR 202 is connected with an interlaced scanning synchronizing signal input terminal 203a of the recording VTR 303 and an interlaced scanning synchronizing signal input terminal 5a of the editing controller 5, so that the editing controller 5 and the interlaced VTR 203 are synchronized by a play back framing information of the progressing VTR 202. Also, a play back time-code output terminal 202d is connected to a time-code input terminal 303c.

The 30 Hz time-code used in the progressing VTR 202, the interlaced VTR 203 and the controller 5 are synchronized with a 30 Hz framing, so as to be able to realize an accurate control of image material on the basis of the 30 Hz time-code.

Accordingly, a video production system of the progressive scanning TV format of the present embodiment is also able to record and edit the image material as the interlaced scanning TV signal by converting progressive scanning TV signal to the interlaced scanning TV signal.

Seventh Exemplary Embodiment

Figure 7:
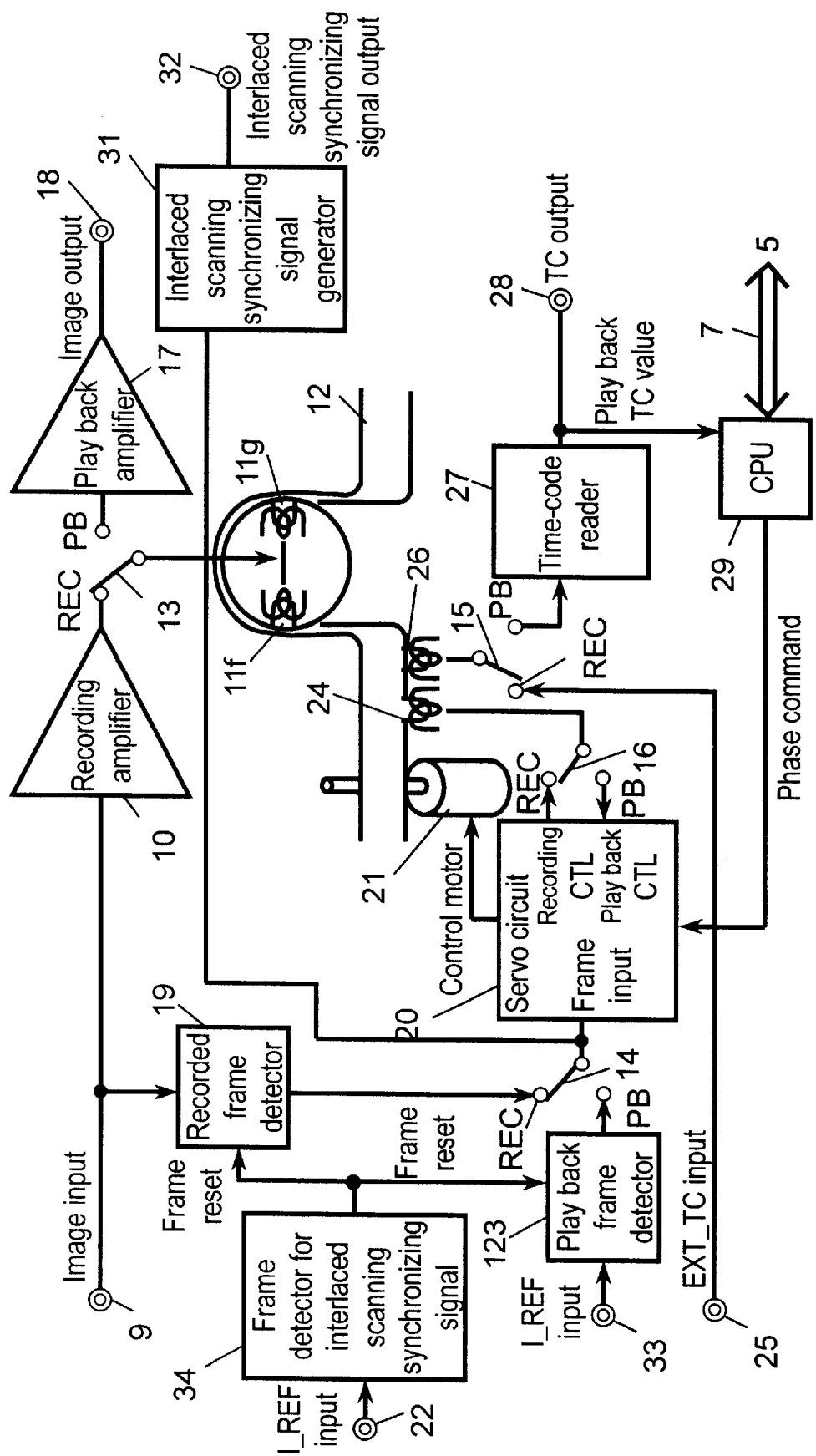
FIG. 7 is a diagram depicting a VTR of the progressive scan TV signal format of a seventh exemplary embodiment of the present invention.

FIG. 7 depicts a progressing VTR in a seventh exemplary embodiment of the present invention, and it is an exemplar of the progressing VTR used in the video production system of the progressive scan TV format shown in FIG. 2, which has been described in the second exemplary embodiment.

Described below are differences between the VTR of the progressive scan TV format of this embodiment and the VTR of the progressive scan TV format of the third exemplary embodiment described along with FIG. 3.

It is provided with a frame detector 34 of an interlaced scanning synchronizing signal, the detector having an interlaced scanning TV synchronizing input terminal (I_REF input) 22 as an input terminal for a synchronizing signal to be used for the basis, and also provided with a play back frame detector 123 having a progressive scanning TV synchronizing input terminal (P_REF input) 33.

Since the play back frame detector 123 is directly input with a progressive scanning synchronizing signal through the progressive scanning synchronizing signal input terminal 33, it can detect a frame frequency (60 Hz), but it can not detect a frequency of two frames (30 Hz). Although the play back frame detector 123 produces a signal corresponding to a two frame period by dividing the frame frequency (60 Hz), but it does not fix the phase.

For this reason, the frame detector 34 of the interlaced scanning synchronizing signal detects a frame signal (30 Hz) out of the interlaced scanning synchronizing signal at the interlaced scanning TV synchronizing input terminal (I_REF input) 22, and fixes phase of an output frame signal (30 Hz) of the play back frame detector 123 by resetting the play back frame detector 123 with the detected frame signal.

Likewise, a recorded frame detector 19 fixes phase of the frame signal also by resetting with the frame signal from the frame detector 34 of the interlaced scanning synchronizing signal, as phase of the frame signal is not fixed with the progressive scanning TV input signal.

Architecture and operation, other than the above, are the same as those of FIG. 3, and the same effect as that of the VTR in FIG. 3 are attainable.

That is, an accurate control of image material can be realized on the basis of the 30 Hz time-code, since it can make a relationship between recording and play back framing (30 Hz) of a servo circuit 20 and a time-code signal at a time-code input terminal 25 identical to that of the VTR of the interlaced scanning TV format (prior art), as can be seen in the tape track pattern of FIG. 8.

The present invention enables existing equipment for the interlaced scanning TV format to be useful also for the progressed scanning TV format. This may be accomplished without requiring a large investment. The invention also realizes a system of the progressed scanning TV format that is capable of carrying out positioning control for the image material with the VTRs of the existing time-code.

As has been described in the fifth and sixth exemplary embodiments (FIG. 5 and FIG. 6), the same effect is attainable with an application of the present invention, even in a system wherein an equipment of the interlaced scanning format and an equipment of the progressive scanning format coexist. Although in the described exemplary embodiments of the present invention, the descriptions presented have been limiting only to the VTRs, this is not exclusive and the present invention is obviously applicable to a semiconductor memory, an optical disc, a magnetic disc, etc., regardless of a recording medium. While there seems to be no standard at this time for the progressive scanning TV in a field frequency of 50 Hz system, the same concept can also apply if the progressive scanning TV format of 50 Hz system is established, and such progressive scanning TV format system will use either a PAL signal for 625 line signal or a composite synchronizing signal of the PAL signal, as the interlaced scanning synchronizing signal.

REFERENCE NUMERALS

1,101 Progressive scanning TV format camera
2,3,102,103,202,203 Progressive scanning TV format VTR
302,303 Interlaced scanning TV format VTR
1a,2a,3a,4a,5a,102a,103a,202a,203a,302a,303a Interlaced scanning TV synchronizing signal input terminal
202e,203e,302e Interlaced scanning TV synchronizing signal output terminal
101b,102b,103b Progressive scanning synchronizing signal input terminal
2c,3c,102c,103c,202c,203c,302c,303c Time-code signal input terminal
2d,4d,102d,202d,302d Time-code signal terminal
4 Time-code generator
5 Editing controller
6 Interlaced scanning synchronizing signal source
7,8 Control command Bus-bar
9 Input terminal for VTR
10 Recording amplifier
11f,11g Rotary head
12 Recording tape
13,14,15,16 Recording/play back selector switch
17 Play back amplifier
18 Image output terminal
19 Recorded frame detector
20 Servo circuit
21 Motor
22 Interlaced scanning TV synchronizing signal input terminal
23,123 Play back frame detector
24 Control head
25 Time-code input terminal
26 Time-code head
27 Time-code reader
28 Time-code output
29 CPU: Central processing unit
30 Progressive scanning TV synchronizing signal source
31 Interlaced scanning synchronizing signal generator
32 Interlaced scanning synchronizing signal output terminal
33 Progressive scanning synchronizing signal input terminal
34 Frame detector for interlaced scanning synchronizing signal
40 Helical track
41 Control track
42 Marking signal
43 Time-code track
209 Format converter

What is claimed is:

1. A video production system having a plurality of video equipment which operates using progressive scanning TV format, comprising:

signal means for generating an interlaced scanning TV synchronizing signal;

means for coupling said signal means to ones of said equipment for carrying out frame synchronization between said ones of said equipment which is regulated by the interlaced scanning TV synchronizing signal; and means for generating a time-code signal of an interlaced scanning TV format, wherein said ones of video equipment includes a device for recording the time code signal and for editing a video signal of the progressive TV format according to a frame regulated by the time code signal.

2. The video production system according to claim 1, wherein said progressive scanning TV format corresponds to the SMPTE296M standard or the SMPTE293M standard.

3. The video production system according to claim 1, wherein said interlaced scanning TV synchronizing signal is an NTSC signal locked by field phase with a progressive scanning TV signal in said progressive scanning TV format or a composite synchronizing signal of an NTSC format.

4. The video production system according to claim 1, wherein said interlaced scanning TV synchronizing signal is a PAL signal locked by field phase with a progressive scanning TV signal in said progressive scanning TV format or a composite synchronizing signal of the PAL signal.

5. The video production system according to claim 1 at least one of said video equipment comprises:

frame detection means for detecting a frame signal element from said interlaced scanning TV signal synchronizing signal; and synchronization means, for correlating a frame signal phase of said video equipment with said frame signal element.

6. The video production system according to claim 1, wherein, at least one of said video equipment comprises:

an interlaced scanning TV synchronizing signal output terminal;

wherein there is an interrelationship of a phase lock between said progressive scanning TV signal output and said interlaced scanning TV synchronizing signal output with respect to at least a field signal element of said interlaced scanning TV synchronizing signal, and further wherein said interlaced scanning TV synchronizing signal is a basic signal for said system.

7. The video production system according to claim 1 comprising:

means for outputting an interlaced scanning TV signal; and conversion means for converting said interlaced scanning TV signal into a progressive scanning TV signal, wherein said interlaced scanning TV signal is recorded and edited as the progressive scanning TV signal.

8. The video production system according to claim 1 comprising:

play back means for reproducing a progressive scanning TV signal;

conversion means for generating one frame of an interlaced scanning TV signal from two frames of said progressive scanning TV signal; and means for producing the interlaced scanning TV synchronizing signal based on said progressive scanning TV signal.

9. The video production system according to claim 1, wherein a frame frequency of the time-code signal is ½ of a frame frequency of the progressive scanning TV format.

10. The video production system according to claim 1, wherein a frame frequency of the time-code signal is identical to a frame frequency of the interlaced scanning TV synchronizing signal.

11. A recording and play back system for a progressive scanning TV signal in a progressive scanning TV signal format comprising:

means for recording said progressive scanning TV signal in a recording medium;

means for reproducing and outputting the progressive scanning TV signal from the recording medium wherein marking signals corresponding to frame punctuation included in said signal is reproduced;

frame detection means for detecting a frame signal from said interlaced scanning TV synchronizing signal;

production means for recording and play back, which is synchronized by said frame detection means; and servo means for controlling a read out speed and phase, so that marking signals are recorded at every two image frames of said progressive scanning TV signal during recording, and the marking signals reproduced from the recording medium correlate with said frame signal during play back.

12. A recording and play back system which operates using a progressive scanning TV signal format comprising:

means for recording a progressive scanning TV signal corresponding to said progressive scanning TV signal format in a recording medium;

means for reproducing and outputting the progressive scanning TV signal from the recording medium;

means for recording and playing back a time-code signal for every two image frames of said progressive scanning TV signal, in order to control recording position for each of said two image frames;

frame detection means for detecting a frame signal from said interlaced scanning TV synchronizing signal;

production means of a frame signal for recording and play back, which is synchronized by said frame detection means for recording and playable of said progressive scanning TV signal; and servo means for controlling a read out speed and phase, so that marking signals corresponding to frame punctuation are recorded every two image frames of said progressive scanning TV signal based on said frame signal during recording, and a reproduced signal is read out of the recording medium so that the marking signals reproduced from the recording medium correlate with said frame signal during play back.

13. A recording and play back system which operates using a progressive scanning TV signal format comprising:

means for recording a progressive scanning TV signal in a recording medium;

means for reproducing and outputting the progressive scanning TV signal from the recording medium;

means for recording and playing back a time-code signal for every two image frames of said progressive scanning TV signal; in order to control recording position for each of said two image frames;

frame detection means for detecting a frame signal from said interlaced scanning TV signal;

production means which is synchronized by an output of said frame detection means for recording and playback of said progressive scanning TV signal;

means for generating an interlaced scanning TV synchronizing signal which is synchronized in phase with said frame signal; and servo means for controlling a read out speed and phase, so that marking signals corresponding to frame punctuation are recorded for each two image frames of said progressive scanning TV signal based on said recorded frame signal during recording, and a reproduced signal is read out of the recording medium so that the marking signals reproduced from the recording medium correlate in a predetermined phase with said frame signal during play back.

14. A recording and play back system which operates using a progressive scanning TV signal format comprising:

means for recording said progressive scanning TV signal;

means for reproducing and outputting the progressive scanning TV signal;

prouduction means for producing a frame signal;

means for generating an interlaced scanning TV synchronizing signal which is synchronized in phase with said frame signal; and servo means for controlling a read out speed and phase, so that marking signals are recorded at every two image frames of said progressive scanning TV signal based on said recorded frame signal during recording, and said reproduced signal is read so that the [frame mark] marking signals which are reproduced correlate in a predetermined phase with said frame signal during play back.

* * * * *